(12) United States Patent
Lee et al.

(10) Patent No.: US 8,868,927 B1
(45) Date of Patent: Oct. 21, 2014

(54) METHOD AND APPARATUS FOR SECURE DATA INPUT AND OUTPUT

(75) Inventors: Johnny Lee, Mountain View, CA (US); Dan Piponi, Oakland, CA (US); Daniel Aminzade, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 13/585,139

(22) Filed: Aug. 14, 2012

(51) Int. Cl.
*G06F 12/14* (2006.01)
*G06F 11/30* (2006.01)

(52) U.S. Cl.
USPC ............................................. 713/189; 726/4

(58) Field of Classification Search
CPC .......... G06F 21/72; G06F 21/10; G06F 21/85
See application file for complete search history.

(56) References Cited

U.S. PATENT DOCUMENTS

| | | | |
|---|---|---|---|
| 7,224,801 B2 | 5/2007 | Abdo et al. | |
| 7,243,237 B2 | 7/2007 | Peinado et al. | |
| 8,180,051 B1 * | 5/2012 | O'Toole, Jr. ................... | 380/255 |
| 8,542,834 B1 * | 9/2013 | Feikis et al. ................... | 380/270 |
| 8,566,608 B2 * | 10/2013 | Pemmaraju ..................... | 713/189 |
| 2009/0070595 A1 * | 3/2009 | Delia et al. ..................... | 713/189 |
| 2009/0144558 A1 * | 6/2009 | Wang ............................. | 713/189 |
| 2010/0002884 A1 | 1/2010 | Sherman | |
| 2010/0195825 A1 * | 8/2010 | Cini ................................ | 380/52 |
| 2010/0278339 A1 * | 11/2010 | Frenkel et al. ................. | 380/210 |
| 2011/0314288 A1 * | 12/2011 | Yogev ............................ | 713/172 |

* cited by examiner

*Primary Examiner* — Fikremariam A Yalew
(74) *Attorney, Agent, or Firm* — Blakely Sokoloff Taylor & Zafman LLP (57) ABSTRACT

A method and apparatus for secure information input and output is described. The method may include initiating a secure data input mode at a user input device coupled with a computing system, wherein the computing system has a processor for executing an operating system, and the user input device is a peripheral input device for receiving input into the computing system. The method may also include receiving user inputted data at the user input device. The method may also include encrypting the user inputted data within the physical bounds of the user input device prior to transmission of the user inputted data from the user input device to the computing system. The method may also include transmitting the encrypted user inputted data to the computing system for routing to a trusted application, the encrypted user inputted data to remain hidden from an operating system of the computing system.

15 Claims, 5 Drawing Sheets

METHOD AND APPARATUS FOR SECURE DATA INPUT AND OUTPUT

TECHNICAL FIELD

Embodiments of the invention relate to the field of data encryption, and more particularly, to enabling computing devices to secure information entry and presentation of data to a user.

BACKGROUND

Information security on computers is often compromised using a simple interception tactic such as keystroke logging, referred to as keylogging, in which malicious hardware or software covertly records the keys pressed on a keyboard. A user of the keyboard is generally unaware that his keystrokes are being recorded or monitored in any way. By stealing passwords with this simple technique, attackers can defeat the complex software security protecting infrastructure data systems.

Keylogging is the most common interception tactic, but other approaches include screen capture software, hidden cameras, and acoustic or electromagnetic analysis. These interception techniques allow user names, passwords, account information, and other sensitive information to be captured. Physical access to a client machine is often quite easy to obtain, making secure data entry and information display on a compromised client machine very challenging. Because keylogging can occur in hardware as well as in many different levels of the operating system and application software layers, keyloggers can be difficult to detect and remove.

SUMMARY

A method and apparatus for secure information input and output is described. According to an exemplary method, a secure data input mode is initiated at a user input device coupled with a computing system, wherein the computing system has a processor for executing an operating system, and the user input device is a peripheral input device for receiving input into the computing system. In one embodiment, user inputted data is received at the user input device. In one embodiment, the user inputted data is encrypted within the physical bounds of the user input device prior to transmission of the user inputted data from the user input device to the computing system. Furthermore, in one embodiment, the encrypted user inputted data is transmitted to the computing system for routing to a trusted application, the encrypted user inputted data to remain hidden from the operating system of the computing system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "receiving", "encrypting", "transmitting", "decrypting", "generating", "sharing", "selecting", "transforming", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In one embodiment, information input and output is secured by input devices, such as keyboards, cursor control devices, fingerprint scanners, etc., and output devices, such as computer system monitors, speaker systems, vibration systems, etc. In one embodiment, the computer system input and output devices encrypt and decrypt data within the physical bounds of the device. In one embodiment, because the encryption and decryption processes discussed herein occur within the physical bounds of an input or output device, and not within a computer system to which the devices are coupled, the data is protected from malicious snooping activities, such as keylogging or other software based attacks. Furthermore, attempts to breach the input and output device's encryption systems would require physical modification of the device itself (e.g., opening, reprogramming, modifying hardwiring, reassembling, etc.), which would likely visibly damage the device or require the device to be replaced with a confederate.

In one embodiment, user-inputted data is encrypted and then transmitted by a user input device to a trusted application. In the embodiments discussed herein, trusted applications have an internal authentication server that includes an encryption/decryption system, which is complementary to the user input device encrypted data generator, to decrypt the input data stream. In one embodiment, the trusted application may reside on a server computer system with which a local computing system is communicatively coupled over a network. In another embodiment, the trusted application may reside on a local computer system to which the user input device is either physically or wireless coupled.

In one embodiment, the raw data generated at a user input device is not exposed to the local computer system's operating system or hardware. That is, the local computer system merely forwards the encrypted data to the trusted application, which then decrypts the user-inputted data to further process the data.

In one embodiment, further security is possible when interacting with cloud services through a web browser or other cloud interface software. In one embodiment, no client-side decryption occurs. This would enable password or other secure text entry to be securely entered even on an entirely compromised client computer. It would only be possible to intercept the data on the client side using low-level hardware or firmware modification of the user input device, resulting in the likely destruction of the device or entire device replacement.

In one embodiment, a secure data entry mode can be manually triggered at the user-input device using a special button or key combination. In another embodiment, the encryption mode may be triggered by client software, a secure user-input mode on a website, etc. For example, when focus is given to a password field or account number field in a web page, a message is sent to the user input device to automatically switch in and out of encryption mode. In one embodiment, the application-triggered secure data entry mode initiation at the user-input device enables mode switching to occur transparently without active involvement by the user.

In one embodiment, flags in the encrypted data can also be used to validate that the keyboard is indeed in encryption mode. That is, data packets that include data encrypted by a user-input device, may further include a flag that the data is encrypted. In one embodiment, if the client software in between a trusted application and the keyboard does not properly engage encryption mode, the user can be alerted.

In one embodiment, the trusted application performs a complementary encryption process on the processed user-inputted data, and returns the processed data to the user's computer system. In one embodiment, a data transducer, such as a computer monitor, audio speaker, etc. further decrypts the data within the physical bounds of the data transducer. The data transducer then presents the unencrypted data to the user. As a result, the transmission of data to and from user-inputted devices to trusted applications, and then to a data output device is in encrypted form.

For example, one embodiment of a secure user input device is a keyboard coupled with a computer system. In one embodiment, the keyboard includes software, hardware, firmware, or a combination that implements a one-time password (OTP) generator. In one embodiment, the encryption method may include a large set of look-up tables that remap user input, such as keystrokes, based on a one-time password (OTP). The OTP would change periodically over time using a typical approach for OTP generation, such as a one-way cryptographic hash function that generates a new password based on the previous password. In one embodiment, the generated OTP key would dynamically select which remapping table to use. With enough remapping tables that are selected in a time-varying manner, recovering the table through observing patterns in the encrypted data would be difficult to nearly impossible. However, more complex methods of encrypting data, as discussed herein, may also be utilized by user input devices, secure application, and data transducers.

In one embodiment, the time-varying encryption key is used within the bounds of the keyboard, before received user inputted data (e.g., keystrokes, touchpad data, etc.) is transferred to a computing system, to encode the outgoing user inputted data. By encrypting the user-inputted data before it is transferred, for example to a computer system to which the keyboard is coupled, any physical man-in-the-middle attack is prevented because the logging tools used for a man-in-the-middle attack would only receive the encrypted data. Furthermore, the logging tools would not have access to the time-varying encryption key, and thus would not be able to decrypt the encrypted user-inputted data.

Figure 1:
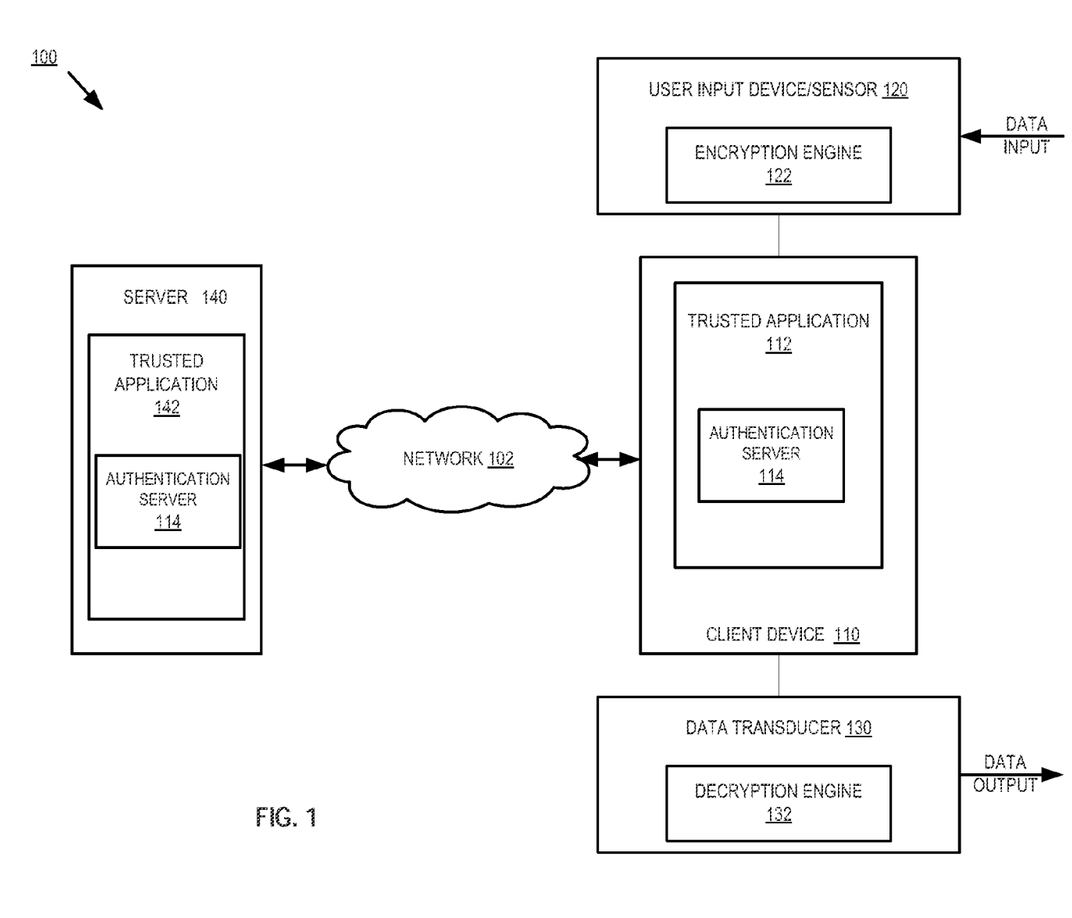
FIG. 1 is a block diagram of exemplary system architecture for enabling secure data input and output.

FIG. 1 is a block diagram of exemplary system architecture 100 for enabling secure data input and output. In one embodiment, the system 100 includes client device 110 and server 140. In one embodiment, client device 110 may be a computing device, such as a desktop computer, laptop computer, personal digital assistant, tablet computer, a mobile telephone, a cellular communication enabled wearable device, etc. In one embodiment, a user input device/sensor 120 and a data transducer 130 are coupled with client device 110. Although only a single server 140, user input device/sensor 120, and data transducer 130 are illustrated, client device 110 may communicate with a plurality of servers via network 102. Furthermore, several user input devices/sensors, such as a keyboard, mouse, touchpad, video camera, microphone, fingerprint scanner, etc., and several data transducers, such as a computer monitor, speakers, optical glasses, etc., may be coupled with client device 110 and perform encryption and decryption consistent with that discussed herein.

The client device 110 and server 140 may be coupled to a network 102 that communicates any of the standard protocols for the exchange of information. In one embodiment, client 110 is coupled with network 102 via a wireless connection, such as a cellular telephone connection, wireless fidelity connection, etc. The client device 110 and server 140 may run on one Local Area Network (LAN) and may be incorporated into the same physical or logical system, or different physical or logical systems. Alternatively, the client device 110 and server 140 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In one embodiment, user input device/sensor, which may be any one of a keyboard, mouse, touchpad, video camera, microphone, fingerprint scanner, iris scanner, etc. receives user input. The user inputted data, which may include programming code, email messages, text messages, URLs, keyboard combinations, PIN codes, credit card numbers, social security number, passport information, address information, stock purchasing information, or any other information related to financially related transactions is encrypted at the user input device. Furthermore, non-text user inputted data, such as voice input for searching, voice ID, verbal login data, etc. may also be encrypted at the data input device/sensor. Additionally, data such as GPS data, motion sensing data, camera data, etc. may also be encrypted in order to make it difficult for man in the middle attacks to recover a user's location, motion behaviors which may identify activity and location, or what images a camera is taking that may include sensitive information or information about a user's location. For ease of discussion, the examples presented herein will be directed to a keyboard for receiving text entry via key presses. However, other user input devices for capturing a wide range of user inputted data may be utilized to encrypt the user-inputted data as discussed herein.

In one embodiment, the user inputted data may be encrypted or unencrypted before it is transferred, via a wired or wireless communication link, to client device 110. In one embodiment, encryption engine 122 of user input device/sensor 120 encrypts user-inputted data in response to the initiation of a secure data transmission mode. In one embodiment, the initiation of the secure data transmission mode is manually triggered by a key press, button, a combination of key presses, or in response to a user performing another type of detectable signal such as a key combination, gesture, voice command, biometric scan that is able to identify a particular user, at the user input device/sensor 120. In another embodiment, the secure data transmission mode is triggered automatically by a client operating system, trusted application, such as trusted application 112 or trusted server application 142, a user accessing a specific data entry field within a trusted application. In yet another embodiment, secure data transmission mode may be used in always on-mode where the synchronization with the trusted applications is provided during manufacturing, during calibration, maintenance, or during sale/configuration of the device. In one embodiment, in response to a user's interaction with trusted application 112 or trusted server application 142, the trusted application 112 or trusted server application 142 may transmit data to client device 110, which in turn transmits data to user input device/sensor 120 which initiates the secure data transmission mode. In one embodiment, the initiation of a secure data entry mode may further include a challenge-response test to very that the user input device/sensor is certified and is behaving as expected helping detect potential tampering or modification.

In one embodiment, user input device/sensor 120 utilizes encryption engine 122 to encrypt received user inputted data, such as key presses, cursor movement, fingerprint scans, etc. In one embodiment, encryption engine 122 is a hardware based encryption device embedded within the physical bounds of user input device/sensor 120, such as within a keyboard enclosure, within a microphone enclosure, within a digital camera case, etc. In another embodiment, encryption engine 122 is software or firmware executed by a processor within the physical bounds of user input device/sensor 122. In yet another embodiment, encryption engine 122 is a combination of one or more hardware, software, or firmware.

In one embodiment, encryption engine 122 receives user inputted data and performs an encryption process on the user inputted data. In one embodiment, encryption engine 122 transforms the user inputted data using a time varying cryptosystem, an RSA based cryptosystem, an Advanced Encryption Standard (AES) based cryptosystem, a Pretty Good Privacy (PGP) based cryptosystem, one or more techniques for hashing the user inputted data with a time varying key, use of one of the aforementioned cryptosystems with public key private key encryption, etc. In one embodiment, the encrypted data is then transmitted, via a wired or wireless connection, to client device 110. In one embodiment, the data is transmitted to client device 110 in a typical data packet that includes data routing information. However, unlike typical data packets, the payload (e.g., user-inputted data) is in encrypted form and thus is hidden from malicious keyloggers, sniffers, etc. Furthermore, the data remains hidden to an operating system of the client device, as only the authentication servers 114 are enabled to decrypted the user inputted data.

In one embodiment, client device 110 receives the data packets including encrypted user-inputted data and routes the data based on the routing information within the data packets. For example, the data packets may be bound for a word processing application on client device 110. However, the data packets may be bound for a web based application, such as a bank account login dialog box on server 140. Because the data packets are encrypted, the data remains hidden to the client operating system, network providers that route the data packet, and corporate or government entities that may be monitoring transmission of the data packets.

In one embodiment, the data packets are routed by client device 110 to one of trusted client application 112 or trusted server application 142. In either case, authentication server 114 receives the data packets with encrypted user-inputted data. In one embodiment, authentication server 114 includes a complementary decryption and encryption system to that employed by encryption engine 122. The authentication server 114 performs a decryption process on the encrypted user-inputted data to obtain the unencrypted form of the user inputted data (i.e., a password, sensitive text, cursor movement, iris scan, fingerprint scan, etc.). The trusted server application 142 or trusted client application 112 then processes the unencrypted user-inputted data. In one embodiment, the processing of the unencrypted user-inputted data might include the trusted server application 142 using the unencrypted user-inputted data as login credentials to log into a website, to supply text to a secure online document editing system, confirm a bank transaction, etc. In one embodiment, the processing of the unencrypted user-inputted data might include the trusted client application 112 processing text to be displayed in a word processing document, entered into a spreadsheet, etc.

In one embodiment, in response to the processing of the user-inputted data, trusted server application 142 and trusted client application 112 further encrypt the processed data before routing the encrypted results for display or other presentation to a user. By trusted server application 142 and/or trusted client application 112 further encrypting the processed data, the data bound for output to a user is also protected from unwanted intruders, and the processed data also remains hidden to an operating system of the client device, as only the data transducer is enabled to decrypted the processed data, as discussed below.

In one embodiment, client device 110 receives the data packets from trusted server application 142 over network 102, or locally from trusted client application. Client device 110 then routes the data packets to data transducer 130. Although only one data transducer is illustrated, client device 110 may route data between several data transducers coupled with client device 110. In one embodiment, decryption engine 132 performs a complementary decryption process on the received encrypted data. In one embodiment, decryption engine 132 is a hardware based decryption device embedded within the physical bounds, such as a monitor, speaker system, wearable display, optical device, etc., of data transducer 130. In another embodiment, decryption engine 132 is software or firmware executed by a processor within the physical bounds of data transducer 132. In yet another embodiment, decryption engine 132 is a combination of one or more hardware, software, or firmware. In one embodiment, after decrypting the encrypted information received from one of the trusted applications 142 or 112, data transducer 130 transforms the data into output for receipt by a user. For example, a computer monitor may decrypt pixel data for text or video in order to activate or update an entire display, content in a window that corresponds to sensitive information within a display, etc. with the processing results of trusted applications 142 or 112. As another example, audio data, such as names, account information, passwords, addresses, messaging content, location data or clues, censored or blocked content, etc., for playback to a user may be decrypted by a secure speaker system 132. In one embodiment, decryption of the processing results within the physical bounds of the data transducer ensures that only the intended recipient is able to view, hear, or otherwise experience the data output, and the data output remains hidden to an operating system of an intermediate client device.

Figure 2:
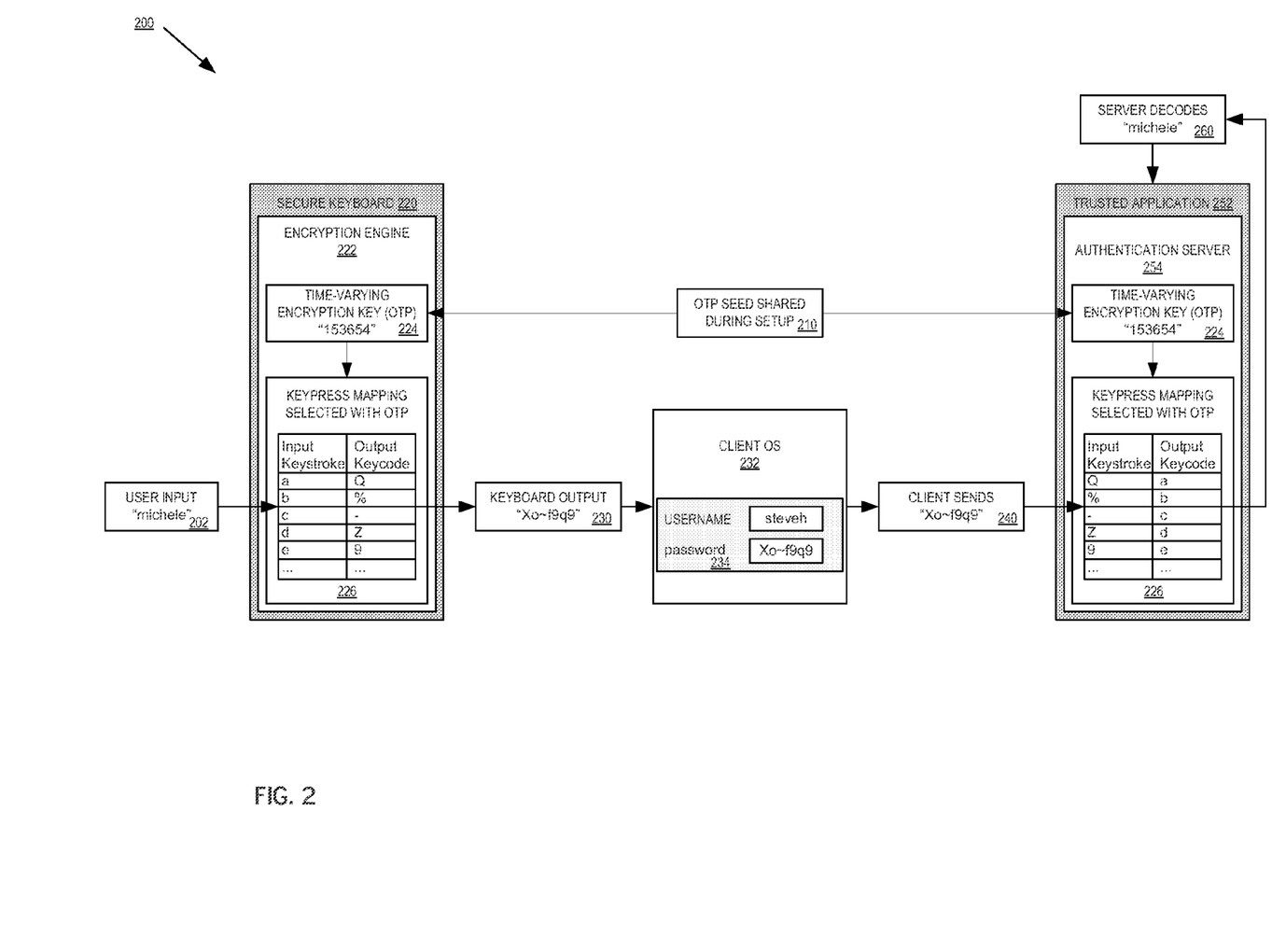
FIG. 2 is a diagram of one embodiment of a method for processing secure data input and output.

FIG. 2 is a diagram of one embodiment of a method 200 for processing secure data input and output. The method 200 is performed by processing logic that may comprise hardware (circuitry, dedicated logic, etc.), software (such as is run on a general purpose computer system or a dedicated machine), firmware, or a combination. In one embodiment, the method 200 is performed by a user input device, client device, and server (e.g., user input device/sensor 120, client device 110, and server 140).

In one embodiment, secure keyboard 220 and trusted application 252 enter into a secure data entry mode. In one embodiment, the secure data entry mode may be triggered manually at secure keyboard 220, or by accessing a secure part of trusted application 252 (e.g., a password entry field on a website). An initial setup is performed between secure keyboard 220 and trusted application 252, such as sharing a one-time password seed 210. In one embodiment, the seed may be encrypted when shared and transmitted between the secure keyboard 220 and trusted application 252. In one embodiment, based on the shared seed, encryption engine 222 and authentication server 254 generate the one-time password 224 and a keypress mapping 226. In one embodiment, the keypress mapping 224 is one of a plurality of hash tables selected based on the OTP 224. In one embodiment, the OTP may be fixed or time-varying. Furthermore, in one embodiment, the number of available hash tables for selection based on OTPs may be sufficiently large to prevent easy prediction and recreation by nefarious or unwanted intruders.

After triggering of the secure data entry mode, secure keyboard 220 receives user input 202. In one embodiment, the user input may be a password, bank account number, or other text entry. However, other forms of user input may be encrypted as discussed herein. Encryption engine 222 utilizes the selected keypress mapping 226 to transform user input 202 within the physical bounds of secure keyboard 220. The transformed, or encrypted data, is then outputted 230 to an operating system (OS) 232 of a client device. Since the data 230 is encrypted, the password 234 remains hidden to client OS 232. Thus, even if client OS is completely compromised by a malicious intruder, the password remains protected.

Client OS 232 transmits the keyboard output 240 to trusted application 252. Authentication server 254, which resides in trusted application 252, utilizes the keypress mapping 226 generated from the OTP 224 to reverse map the encrypted data 240 into unencrypted form 260. In one embodiment, trusted application 252 then processes the unencrypted data 260.

In one embodiment, although not shown, a similar process is used to encrypt data for transmission to a data transducer. That is, the data transducer and trusted application share an OTP seed during a setup process, the trusted application encrypts processed data within the bounds of a trusted application, and a data transducer decrypts the encrypted data within the physical bounds of the data transducer.

Figure 3:
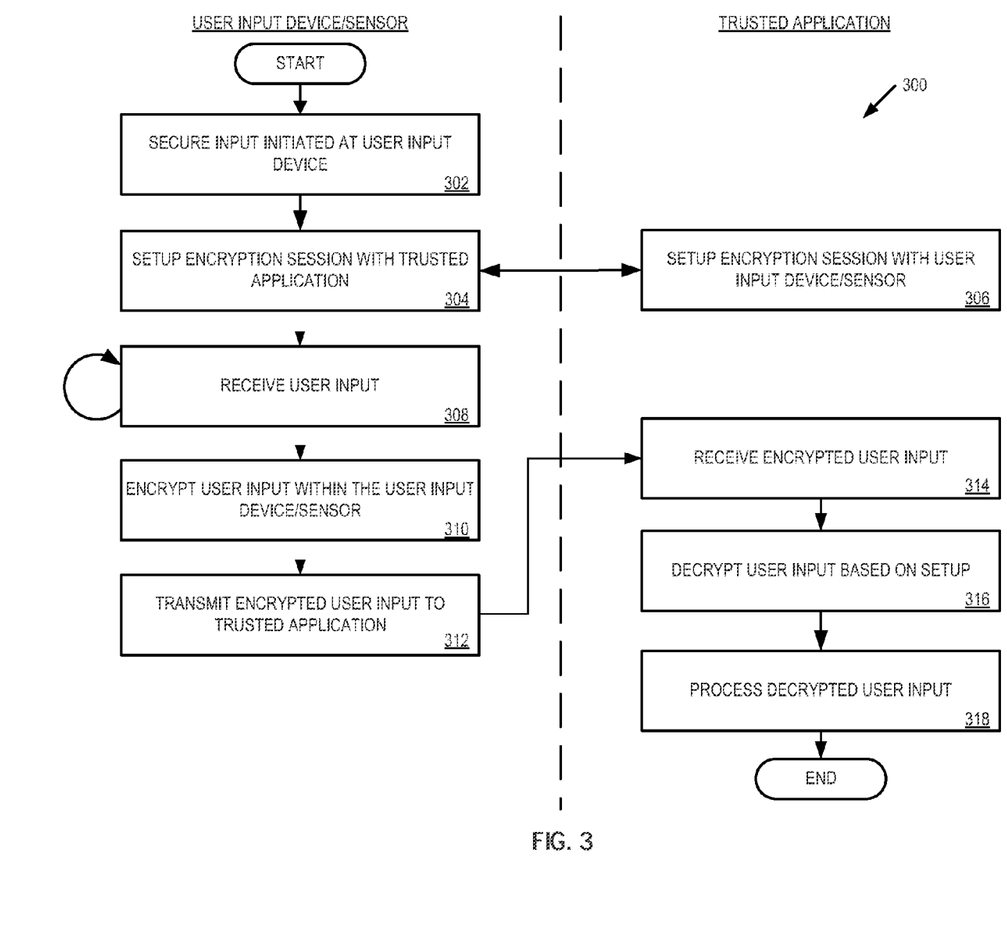
FIG. 3 is a flow diagram of one embodiment of a method for securing user-inputted data.

FIG. 3 is a flow diagram of one embodiment of a method 300 for securing user-inputted data. The method 300 is performed by processing logic that may comprise hardware (circuitry, dedicated logic, etc.), software (such as is run on a general purpose computer system or a dedicated machine), firmware, or a combination. In one embodiment, the method 300 is performed by a user input device/sensor and a trusted application (e.g., user input device/sensor 120 and encryption engine 122, and trusted application 112 or 142). Furthermore, in the embodiments discussed herein, the processing logic resides within the physical confines of the user input device/sensor, and within the processing confines of the trusted application.

Referring to FIG. 3, processing logic begins with a secure input mode being initiated at a user input device (processing block 302). In one embodiment, the secure input mode may be initiated with the depression of a particular button, combination of keys, etc. on a user input device. In another embodiment, secure input mode is initiated by a trusted application based on a current state of the application. For example, when a user navigates or otherwise enters an area of trusted application where data entry should be secured, trusted application can automatically trigger the secure input mode of user input device/sensor.

Processing logic then sets up an encryption session between user input device/sensor and a trusted application (processing blocks 304 and 306). In one embodiment, the encryption setup may include generating a time varying one time password for encrypting user inputted data within the physical bounds of an input device/sensor. In one embodiment, setup information, such as public encryption keys, may be exchanged.

After the initial setup of the encryption session, processing logic of the user input device/sensor receives user input (processing block 308). The user input may be a string of keypresses, audio data, video data, cursor movements of an input device, fingerprint scan, retina scan, etc. The user input is encrypted by processing logic within the physical confines of the user input device/sensor (processing block 310). In one embodiment, processing logic utilizes an encryption key, such as a time varying encryption key, and user identification data, such as GPS data, login data, biometric data, etc. to encrypt the user input and tie the input to the specific device and user. The combination of both a time varying key as well as user identification data ensures that both the correct device and the correct user are both present to generate the correct encryption pattern for the transmitted information. Data from the identification sensor itself provides a key that is unique to the user that can be used to further secure the encryption. Examples of user identification data may include, but are not limited to, biometric sensing, finger print scanner, blood sample, DNA sequencing, breath content, or motion recognition such as walking patterns. In one embodiment, the user input is saved to a buffer within the user input device/sensor, and processing logic reads the data from the buffer when encrypting the data. In another embodiment, processing logic reside between the physical transformation of user input and the data buffer, and encrypts the data before it is saved within the user input device/sensor. In this embodiment, the user input never exists in the user input device/sensor in unencrypted form. Processing logic then transmits the encrypted user input to the trusted application (processing block 312).

Processing logic at the trusted application receives the encrypted user input (processing block 314). The encrypted data is decrypted based on the setup information (processing block 316). For example, and as discussed above, processing logic may reverse map keypress characters based on a hash table selected for a time varying OTP. As another example, processing logic may use user input device's public encryption key. Once the data is decrypted, processing logic of the secure application utilizes the unencrypted form of the user input to process the data (processing block 318).

Figure 4:
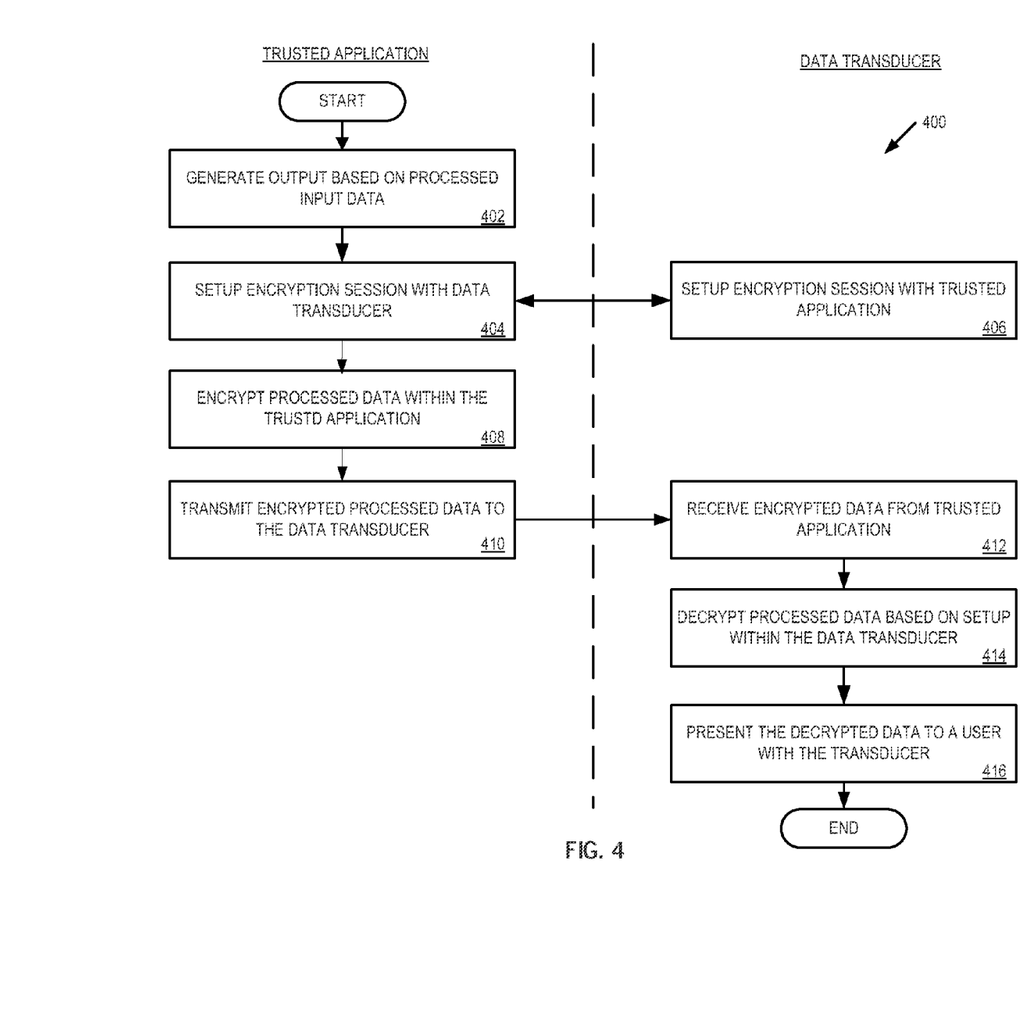
FIG. 4 is a flow diagram of one embodiment of a method for presenting secured data to a user.

FIG. 4 is a flow diagram of one embodiment of a method 400 for presenting secured data to a user. The method 400 is performed by processing logic that may comprise hardware (circuitry, dedicated logic, etc.), software (such as is run on a general purpose computer system or a dedicated machine), firmware, or a combination. In one embodiment, the method 400 is performed by a trusted application and a data transducer (e.g., trusted application 112 or 142, and data transducer 130). Furthermore, in the embodiments discussed herein, the processing logic resides within the physical confines of the data transducer, and within the processing confines of the trusted application.

Referring to FIG. 4, processing logic begins by generating output based on processed unencrypted user data (processing block 402). That is, processing logic generates an output based on the unencrypted user inputted data generated in FIG. 3. After the output is generated, processing logic performs a setup between the trusted application and the data transducer (processing blocks 404 and 406). As discussed above, this setup process may include sharing a new time varying one time password, encryption keys, etc.

Processing logic encrypts the processed data within the trusted application (processing block 408) and transmits the encrypted processed data to data transducer (processing block 410). In one embodiment, processing logic may route the data to a client system over a network with routing information specifying to which data transducer the data is to be directed. In another embodiment, processing logic routes the data locally within a client system to a data transducer coupled with the client system.

Processing logic at the data transducer receives the encrypted data from the trusted application (processing block 412). The processing logic then decrypts the encrypted data within the physical confines of the data transducer (processing block 414). Processing logic then causes data transducer to present the data to a user (processing block 416). Presentation of the data to a user may include displaying unencrypted pixel data on a visual data transducer, playing unencrypted audio data on an audio data transducer, causing a decryption pattern to be used by an optical steganography device, etc.

As discussed herein, combining encrypting keyboards and other user input devices, such as pointing devices, touch sensors, motion sensors, microphones, with decrypting data transducers, such as displays, speakers, vibration into an integrated computing platform such as a phone, tablet, laptop, or wearable device that communicates directly with trusted application, network based trusted application, etc. creates computing ecosystem that is very difficult to compromise.

Figure 5:
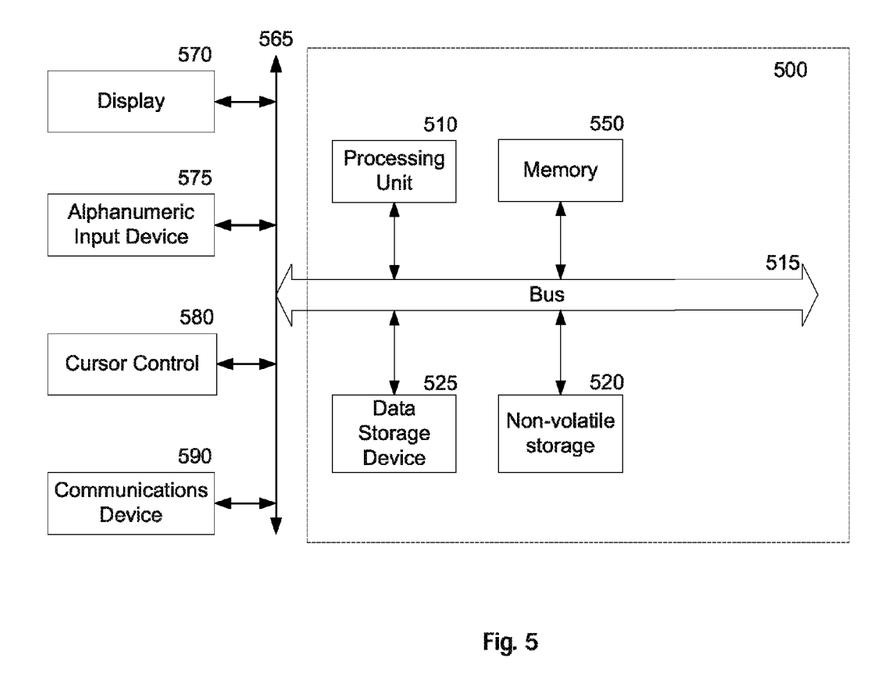
FIG. 5 illustrates a diagrammatic representation of a machine in the exemplary form of a computer system.

FIG. 5 is one embodiment of a computer system that may be used with the present invention. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a cathode ray tube (CRT) or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments of the present invention.

It will be appreciated by those of ordinary skill in the art that any configuration of the system may be used for various purposes according to the particular implementation. The control logic or software implementing the present invention can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The present invention may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method, comprising:
   initiating a secure data input mode at a user input device coupled with a computing system, wherein the computing system has a processor for executing an operating system, and the user input device is a peripheral input device for receiving input into the computing system;
   receiving user identification data and user inputted peripheral device data at the user input device;
   encrypting the user inputted peripheral device data within the physical bounds of the user input device prior to transmission of the user inputted data from the user input device to the computing system, wherein the user inputted peripheral device data is encrypted with an encryption key that is based on a time varying password and the user identification data, the encryption key tying the encrypted user inputted peripheral device data to the user input device and a specific user;
   transmitting the encrypted user inputted peripheral device data to the computing system for routing to a trusted application, the encrypted user inputted peripheral device data to remain hidden from an operating system of the computing system;
   receiving encrypted data at a data transducer from the trusted application, the encrypted data generated by the trusted application from an unencrypted form of the encrypted user inputted peripheral device data, wherein the data transducer is a second peripheral device coupled with the computing system, and the second peripheral device is one of a computing system monitor, audio speaker system, or vibration system;
   decrypting the encrypted data within the physical bounds of the data transducer; and
   generating a data output, from the decrypted encrypted data, for presentation to the user with the data transducer, wherein the received encrypted data to remain hidden from the operating system of the computing system.

2. The method of claim 1, wherein the encrypted user inputted peripheral device data is routed by the computing system over a network to a network based trusted application, the network based trusted application to decrypt the encrypted user inputted peripheral device data within the processing confines of the network based trusted application.

3. The method of claim 1, wherein the encrypted user inputted peripheral device data is routed by the computing system to a local trusted application executed by the computing system, the local trusted application to decrypt the encrypted user inputted peripheral device data within the processing confines of the local trusted application.

4. The method of claim 1, wherein the encrypting further comprises:
   generating a time varying one time password seed at the user input device;
   sharing the time varying one time password seed with the trusted application;
   selecting one of a plurality of remapping tables based on the time varying one time password seed; and
   transforming the user inputted peripheral device data into an encrypted form of the user inputted data based in part on the selected one of the plurality of remapping tables.

5. The method of claim 1, wherein the peripheral input device is one of a keyboard, cursor control device, or touchpad, the user inputted peripheral device data is one of keypress data, cursor movement data, or cursor selection data, and the user identification data is one of motion recognition data or scanned biometric data.

6. The method of claim 1, wherein the secure data input mode is initiated at the user input device in response to a user command received at the use input device.

7. The method of claim 1, wherein the secure data input mode is initiated at the user input device without receipt of a user command and in response to receipt of a command from the trusted application.

8. A system comprising:
   a computing system with a processor for executing an operating system;
   a user input device coupled with the computing system, wherein the user input device is a peripheral device for receiving input into the computing system, to
      initiate a secure data input mode,
      receive user inputted peripheral device data and user identification data,
      encrypt the user inputted peripheral device data within the physical bounds of the user input device prior to transmission of the user inputted data from the user input device to the computing system, wherein the user inputted peripheral device data is encrypted with an encryption key that is based on a time varying password and the user identification data, the encryption key tying the encrypted user inputted peripheral device data to the user input device and a specific user, and transmit the encrypted user inputted peripheral device data to the computing system for routing to a trusted application, the encrypted user inputted peripheral device data to remain hidden from the operating system of the computing system; and a data transducer coupled with the computing system to
receive encrypted data from the trusted application, the encrypted data generated by the trusted application from an unencrypted form of the encrypted user inputted peripheral device data, wherein the data transducer is a second peripheral device coupled with the computing system, and the second peripheral device is one of a computing system monitor, audio speaker system, or vibration system, decrypt the encrypted data within the physical bounds of the data transducer, and generate a data output, from the decrypted encrypted data, for presentation to the user with the data transducer, wherein the received encrypted data to remain hidden from the operating system of the computing system.

9. The system of claim 8, wherein the encrypted user inputted peripheral device data is routed by the computing system over a network to a network based trusted application, the network based trusted application to decrypt the encrypted user inputted peripheral device data within the processing confines of the network based trusted application.

10. The system of claim 8, wherein the encrypted user inputted peripheral device data is routed by the computing system to a local trusted application executed by the computing system, the local trusted application to decrypt the encrypted user inputted peripheral device data within the processing confines of the local trusted application.

11. The system of claim 8, wherein the user input device to encrypt the user inputted data further comprises the user input device to generate a time varying one time password seed at the user input device, share the time varying one time password seed with the trusted application, select one of a plurality of remapping tables based on the time varying one time password seed, and transform the user inputted peripheral device data into an encrypted form of the user inputted data based in part on the selected one of the plurality of remapping tables.

12. The system of claim 8, wherein the peripheral input device is one of a keyboard, cursor control device, or touchpad, the user inputted data is one of keypress data, cursor movement data, or cursor selection data, and the user identification data is one of motion recognition data or scanned biometric data.

13. The system of claim 8, wherein the secure data input mode is initiated at the user input device in response to a user command received at the use input device.

14. The system of claim 8, wherein the secure data input mode is initiated at the user input device without receipt of a user command and in response to receipt of a command from the trusted application.

15. A non-transitory computer readable storage medium including instructions that, when executed by a processor, cause the processor to perform a method comprising:

initiating a secure data input mode at a user input device coupled with a computing system, wherein the computing system has a processor for executing an operating system, and the user input device is a peripheral device for receiving input into the computing system;

receiving user inputted peripheral device data at the user input device;

encrypting the user inputted peripheral device data within the physical bounds of the user input device prior to transmission of the user inputted peripheral device data from the user input device to the computing system, wherein the user inputted peripheral device data is encrypted with an encryption key that is based on a time varying password and the user identification data, the encryption key tying the encrypted user inputted peripheral device data to the user input device and a specific user;

transmitting the encrypted user inputted peripheral device data to the computing system for routing to a trusted application, the encrypted user inputted peripheral device data to remain hidden from an operating system of the computing system;

receiving encrypted data at a data transducer from the trusted application, the encrypted data generated by the trusted application from an unencrypted form of the encrypted user inputted peripheral device data, wherein the data transducer is a second peripheral device coupled with the computing system, and the second peripheral device is one of a computing system monitor, audio speaker system, or vibration system;

decrypting the encrypted data within the physical bounds of the data transducer; and generating a data output, from the decrypted encrypted data, for presentation to the user with the data transducer, wherein the received encrypted data to remain hidden from the operating system of the computing system.

* * * * *